Figure 3:
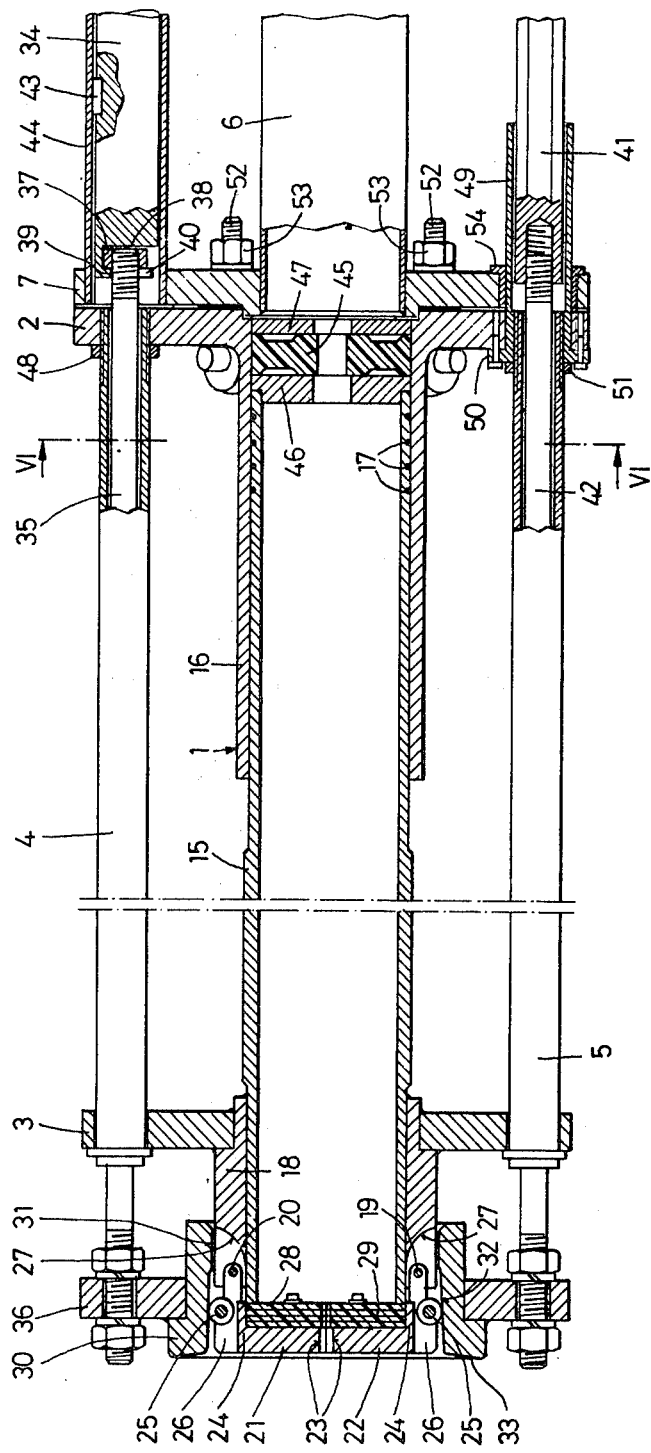

United States Patent [19]

Magnollay

[11] 4,003,690
[45] Jan. 18, 1977

[54] CLOSURE DEVICE

[75] Inventor: Gilbert Magnollay, Romanel, Switzerland

[73] Assignee: Maillefer S.A., Switzerland

[22] Filed: Mar. 22, 1976

[21] Appl. No.: 668,920

[52] U.S. Cl. .............................. 425/466; 425/190; 425/381; 425/461; 425/113

[51] Int. Cl.² .......................................... B29F 3/04

[58] Field of Search .......... 425/188, 190, 376, 380, 425/381, 461, 466, 113

[56] References Cited
UNITED STATES PATENTS

| | | | |
|---|---|---|---|
| 2,387,718 | 10/1945 | Coleman | 425/466 |
| 2,425,237 | 8/1947 | Field | 425/461 X |
| 3,748,079 | 7/1973 | Moreno et al. | 425/466 |
| 3,902,835 | 9/1975 | Theysohn | 425/380 X |
| 3,966,381 | 6/1976 | Suh | 425/461 |

Primary Examiner—Robert L. Spicer, Jr.
Attorney, Agent, or Firm—Stevens, Davis, Miller & Mosher

[57] ABSTRACT

This invention relates to a downstream closure device for apparatus used in treating large-diameter insulated electrical conductors, the device comprising a main exit gasket, a movable plug, an auxiliary exit gasket borne by the plug, and means for controlling the movement of the plug.

11 Claims, 5 Drawing Figures

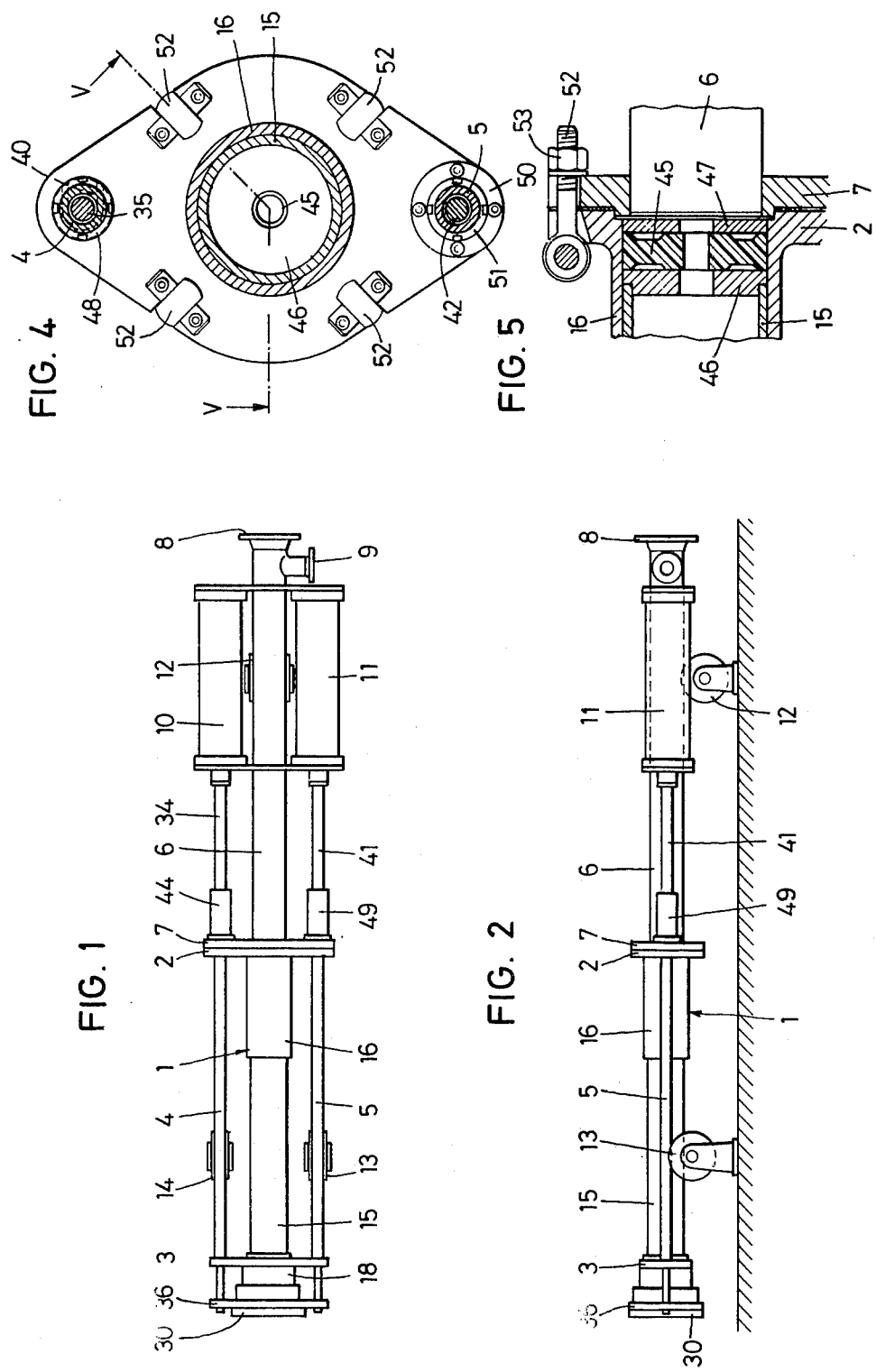

CLOSURE DEVICE

Known apparatus for treating insulated electrical conductors, intended for large-diameter cable, for example, generally comprise an enclosure some 40 or 50 meters long or more through which the cable passes from one end to the other, which is positioned at a slant, the lower half of which is filled with cold water for cooling the insulation, and the upper half of which is filled with steam for carrying out the cross-linking treatment which the insulation must undergo when it solidifies. Such apparatus are closed at their upstream or upper end by the extruder head, which the conductor leaves coated with its insulating jacket, and at their downstream end by a closure device comprising an annular gasket, generally of synthetic resin, fitted to the outside diameter of the insulation, through which gasket the conductor passes substantially without any clearance. When production of an insulated cable is started up, the end of the conductor is attached to a pulling-wire which has previously been inserted through the enclosure and which is used to pull the cable until it reaches the downstream end of the enclosure and is attached to the reel or drum on which the finished cable is to be taken up. As the pulling-wire is no larger in diameter than the metal core of the conductor, and is usually even much thinner, the downstream gasket is not sealed tightly until the part of the cable which has already been coated with its insulating jacket has arrived at the level of that gasket. In order that the enclosure may be kept under pressure and that the insulation may be properly treated throughout the length of the first section of cable to pass through, corresponding to the length of the enclosure itself, provision is made downstream from the main gasket for an auxiliary gasket which is equal in diameter to the pullingwire. The auxiliary gasket and the main gasket are disposed at the respective ends of a section of the enclosure. The auxiliary gasket, being at the downstream end, ensures that the treatment enclosure is fluid-tight until the insulating jacket has reached the main gasket.

At the moment when the insulating jacket arrives at the main gasket, the downstream tubular section is completely closed; and as soon as the insulating jacket enters this part of the enclosure, it acts like a piston, tending to compress the water contained therein. The immediate result would be a considerable increase in pressure in that section if provision were not made to open the auxiliary gasket at precisely that moment. Hence known treatment apparatus are equipped with control means for effecting that opening, and in most cases, these control means are arranged to cause the auxiliary gasket to open as quickly as possible, in order to prevent the overpressure mentioned above.

However, the known downstream closure devices present a number of drawbacks. First of all, they are heavy and complicated in their construction. Hence it takes some hard work to dismantle them, which means that the main gasket is difficult of access when it becomes necessary to check its condition and possibly change it during an overhaul.

Furthermore, another result of the cumbersomeness and dismantling difficulty of these closure devices is that the downstream end of the stationary part of the enclosure is not easily accessible either.

Finally, it has been found that because of the overpressure produced in the downstream section at the moment when the insulating jacket reaches the level of the main gasket, the abrupt opening of the auxiliary gasket causes a water-hammer which is transmitted to the whole stationary part of the enclosure and is liable to cause the conductor to oscillate in such a way that some parts of it touch the walls of the enclosure. Thus the insulation of the conductor may be damaged in spots as a result of these jolts.

It is a main object of this invention to provide a downstream closure device which, by virtue of its sensible construction, avoids water-hammering in the stationary part of the enclosure through an arrangement which is, at the same time, simpler and more convenient to use than that of the prior art closure devices.

To this end, in the downstream closure device according to the present invention, the means of controlling the movement of the plug comprise a control-sleeve cooperating with the plug for causing the plug to open gradually.

A preferred embodiment of the invention will now be described in detail with reference to the accompanying drawings, in which:

FIG. 1 is an overall top plan view on a reduced scale,
FIG. 2 is an elevation on the same scale as FIG. 1,
FIG. 3 is a horizontal section on a larger scale,
FIG. 4 is a section taken on the line IV—IV of FIG. 3, and
FIG. 5 is a partial section taken on the line V—V of FIG. 4.

FIG. 1 shows the downstream part of an enclosure in which the insulation of a large-diameter cable is treated. The last section of this enclosure is designated by reference numeral 1; it comprises two flanges 2 and 3, between which tubular tie-rods 4 and 5 are secured, and bears the elements of the downstream closure device to be described in detail below. It is secured by the flange 2 to the downstream end of the stationary part of the enclosure, a section 6 of which, having two end flanges 7 and 8, may be seen in the drawing. The section 6 comprises a laterally disposed pipe 9 for filling and emptying the enclosure. It also bears the bodies of two jacks 10 and 11, disposed one on each side of the section 6, parallel to its longitudinal axis. The section 6 rests upon a roller 12 intended to absorb the thermal expansion of the enclosure as a whole. As may be seen in FIG. 2, the end section 1 is likewise supported by rollers 13 and 14 which have peripheral grooves and are engaged under the tubular tie-rods 4 and 5. The flange 8 is connected to a tubular section (not shown) constituting a further part of the stationary portion of the enclosure. It is to be understood that although the sections 1 and 6 are shown in FIGS. 1 and 2 as being disposed horizontally, the enclosure as a whole will be positioned at a slant so that the cable within, which is suspended between the exit gasket and the extruder head, may hang freely in the shape of a catenary curve under the effect of its own weight.

FIGS. 3, 4, and 5 show the details of the downstream closure device described here. It will be seen that the end section 1 is composed of two tubular elements 15 and 16, fitted one into the other, the element 15 being the smaller in diameter and situated downstream from the element 16. At its downstream end, the element 15 bears a casing 18 serving to support the downstream flange 3 of the section 1 and two pivot-joints 19 and 20, having parallel axes, on which plug elements 21 and 22 are mounted. Each of the plug elements 21 and 22 is a semicircular plate having a groove 23 in its flat edge and a peripheral rim 24 facing upstream. Each plug element 21, 22 also has a radial groove in its peripheral edge for accommodating a roller 25, the axle of which is borne by two brackets 26, each welded against one of the sides of the radial groove. The brackets 26 extend towards the rear, i.e., upstream, the end portion of each being engaged in a slot 27 in the casing 18. Thus the axes of the two pivot-joints 19 and 20 are defined by the axes of the end portions of the brackets 26 welded to each of the plug elements 21 and 22. These two pivoting axes are parallel, are both contained in the same plane perpendicular to the longitudinal axis of the device, and are also parallel to the two flat diametrical faces of each of the plug elements 21, 22. Each half-plug 21 or 22 bears a semi-annular gasket 28, 29 secured by a screw to the plug element within the rim 24 and provided with a central groove which, when the plug elements 21, 22 are in the position shown in FIG. 3, define an orifice corresponding in diameter to the pulling-wire attached to the conductor to be treated. The gaskets 28 and 29 are fastened by screws so as to be interchangeable. The size of the circular orifice delimited by the two grooves in the gaskets 28 and 29 is, in each case, adapted to that of the pulling-wire. It follows from the foregoing that each of the plug elements 21 and 22 can pivot about the axis of its respective pivot-joint 19, 20 between the position shown in FIG. 3 and an open position resulting from a rotation by a quarter of a turn towards the outside.

For controlling the movements of the half-plugs 21 and 22, the device comprises a guide-sleeve 30. This is a tubular part having a cylindrical inner surface 31 fitted to the cylindrical outer surface of the casing 18 so as to be able to slide on that casing. The surface 31 does not extend over the entire axial length of the sleeve 30 but only over the upstream portion of it. Towards downstream, starting from the end of the surface 31, the sleeve 30 has a first frustoconical inner surface 32 opening up very slightly with respect to the longitudinal axis of the device, say about 10°, for example, then finally a second frustoconical surface 33 joined to the surface 32 by a rounding and having an angle of opening to about 75°–80°, for example, with respect to the longitudinal axis of the device. It will be realized that if, in the position shown in the drawing, the inside of the tubular section 1 is subjected to pressure, the plug elements 21 and 22 will be held closed by the rollers 25 pressing on the surface 32 of the sleeve 30. Thus in its extreme downstream position, the sleeve 30 therefore keeps the two half-plugs 21, 22 completely closed. The rims 24 press against the downstream end of the tubular section 15. Starting from this position, if the sleeve 30 is moved upstream, the rollers 25 run over the guide-surface 32, thus enabling the two half-plugs 21 and 22 to open, at first slowly and then gradually more rapidly. Starting from the moment when the rollers 25 arrive at the roundings between the surfaces 32 and 33, the speed of opening of the half-plugs 21 and 22 increases, and the rollers 25 come in contact with the frustoconical surface 33, which they press against until the plug is completely open. In the arrangement shown in the drawing, the guide-sleeve 30 can move until it comes up against the downstream face of the flange 3. It would be possible, however, to have the outer surface of the sleeve 30 threaded and to screw a nut on this thread so that the sleeve 30 would be adjustable in length, thus limiting its upstream movement when the nut comes in contact with the flange 3.

As initially mentioned, the device being described is controlled by the two jacks whose bodies 10 and 11 are shown in FIG. 1. These jacks are used to move the guide-sleeve 30. Each of them comprises a two-part rod. FIG. 3 shows a bar 34 constituting the first part of the rod of the jack 10 and a bar 35 constituting the second part of it. This second part is secured by two nuts to an oblong flange 36 welded to the sleeve 30. The two parts 34 and 35 of the rod of the jack 10 are joined by a bayonet-connection. The upstream end of the bar 35 is threaded and bears a nut 37 which is engaged in a slot 38 in the downstream end of the bar 34. A retaining element 39 which delimits the slot 38 on the downstream side has a notch 40 for engaging the threaded portion of the bar 35. The notch 40 (FIG. 4), having a slightly V-shaped profile, opens out upwards. The bar 34 is provided with a key 43 engaged in a groove made in a fixed sleeve 44 which is integral with the downstream flange 7 of the section 6 of the enclosure.

The rod of the jack 11 is likewise composed of two bars 41 and 42. However, these two parts are rigidly joined to one another in that a threaded end of the bar 42 is screwed into a tapped socket in the bar 41, which also exhibits a flat. The connection between the bars 41 and 42 is enclosed within a sleeve 49 secured to the flange 2, the tie-rod 5 being screwed into a tapped portion of the sleeve 49. Furthermore, the sleeve 49 is freely engaged in a bearing-bush 54 integral with the flange 7.

The operation of the device upon opening of the plug 21/22 follows clearly from the drawing. If the rod-bars 34 and 41 are moved axially upstream, they pull the rod-bars 35 and 42 along with them. The latter slide in the tie-rods 4 and 5 and pull the guide-sleeve 40 upstream as indicated above.

However, in the embodiment being described, the jacks 10 and 11 and their rods perform still other functions.

The most important of these ancillary functions of the jacks 10 and 11 is to enable the final tightening of the main gasket at the moment when the auxiliary gasket is opened. The main gasket is composed of an annular part 45 (FIGS. 3 and 5) which is rectangular in profile but may also have recesses in its axial faces. The part 45 may be of synthetic resin or of an elastomer. It is pressed between a downstream ring 46 on the one side and an upstream ring 47 on the other side. Its outside diameter is fitted to the inside diameter of the element 16, which is integral with the flange 2. Moreover, in the downstream edge of the ring 46 is an undercut which engages the upstream end of the tubular element 15, while the upstream face of the ring 47 is flat and intended to press peripherally directly against the central portion of the flange 7, which comprises a centering rim cooperating with a corresponding undercut in the flangle 2. As mentioned above, the depth to which the tubular element 15 is engaged within the section 16 can be adjusted at will by screwing the tie-rods 4 and 5 in the flange 2 or the sleeve 49 and locking them in place by means of check-nuts 48 and 51. The position of the gasket part 45 within the element 16 depends upon the depth of engagement when the ring 46 is in contact with the upstream end of the element 15. Thus the position of the gasket part 45 may easily be adjusted before the downstream section 1 is put in place.

According to the adjustment of the tie-rods 4 and 5 in the flange 2, the ring 47 will project beyond the limits of the flange 2 to a greater or lesser extent when the tubular section 1 is disengaged. Normally, i.e., when the apparatus is ready to operate, the end section 1 is rigidly connected to the rest of the enclosure. For that purpose, the flange 2 is secured to the flange 7 by means of four pivoting bolts 52 which are borne by the flange 2 and which engage in radial slots in the flange 7. Nuts 53 make it possible to produce a first preliminary tightening, so that the ring 47 comes up against the front face of the flange 7 and squeezes the gasket 45 against the ring 46. However, it is possible to adjust the position of the nuts 53 in such a way that the gasket 45 is squeezed only lightly when the installation is started up. When the jacks 10 and 11 are operated to open the auxiliary gasket, the guide-sleeve 30, or the nut which it may carry, comes up against the flange 3, as has been seen above. Via the tie-rods 4 and 5 operating by compression, the jacks 10 and 11 can then press the end sections 1 as a whole against the flange 7 so as to perfect the tightening of the gasket 45. As a result of the slight displacement which then takes place, the nuts 53 can thereafter be retightened.

Another ancillary function of the jacks 10 and 11 consists in bringing about the disengagement of the end section 1 for the purpose of dismantling the main gasket or for inspecting the downstream end of the enclosure. It will be obvious that if the rods of the jacks 10 and 11 are moved downstream after the half-plugs 21 and 22 have been closed, and after the nuts 53 have been loosened and the pivoting bolts 52 pushed back, the end section 1 as a whole will move downstream. It is carried at the downstream end by the rollers 13 and 14, supporting the tie-rods 4 and 5. The end section 1 is likewise supported at the upstream end by an arrangement which has already been described above, for the sleeve 49 moves along with the flange 2 while sliding in the bearing-bush 54 borne by the flange 7. As long as the movement does not exceed the length of the sleeve 49, the latter will support the end section 1 on the flange 7. On the opposite side of the apparatus, the weight of the end section 1 will be borne by the rod-bar 34 sliding in the sleeve 44. At the same time, the bayonet-connection 37, 38, 39 described above will become disengaged from the sleeve 44 while remaining situated just in front of the flange 2.

When the end section 1 has been brought into its disengaged position in this way, it is possible to pivot it about the axis of the tie-rod 5. The roller 13, on the one hand, and the sleeve 49 resting in the bearing-bush 54, on the other hand, constitute the bearings which guide this pivoting movement, which is produced simply by taking hold of the tie-rod 4 with the hand and lifting it. The end of the rod-bar 35 with its nut 37 passes through the notch 40 and separates from the bar 34. This pivoting movement completely exposes the downstream end of the section 6, on the one hand, and the elements of the gasket 45, on the other hand, thus affording easy access both to the inside of the enclosure and to the gasket parts. To replace the end section 1, it suffices to push it back and to operate the jacks in the other direction, then to pivot the bolts 52 back into place and tighten the nuts 53.

As mentioned at the beginning, however, the main function of the jacks 10 and 11 is to bring about the gradual opening and closing of the half-plugs 21 and 22. In particular, it has been found that the gradual opening of these half-plugs at the moment when the insulating jacket passes through the main gasket makes it possible to avoid water-hammering within the enclosure. The guide-sleeve may also be moved in such a way as to cause the half-plugs 21 and 22 to open partially and to keep them positioned at an angle in order to direct the stream of water which then spurts out. The control of these half-plugs by means of a gradually-advancing control-sleeve also makes it possible to regulate the escape at the auxiliary gasket, as well as to monitor the flow at the main gasket. This control may be effected automatically by a pressure-differential measurement at the moment when the overpressure within section 1 of the enclosure exceeds a predetermined threshold.

What is claimed is:

1. A downstream closure device for apparatus used in treating large-diameter insulated electrical conductors, said device comprising a main exit gasket, a movable plug, an auxiliary exit gasket borne by said plug, and means for controlling the movement of said plug, wherein said means comprise a control-sleeve cooperating with said plug for causing said plug to open gradually.

2. A closure device in accordance with claim 1, wherein said plug is composed of two plug-parts and said auxiliary exit gasket comprises two semicircular elements mounted respectively on said two plug-parts, said plug-parts being pivotingly mounted on respective spindles having parallel axes both situated in a plane perpendicular to the longitudinal axis of said device, each said plug-part comprising a roller cooperating with said control-sleeve, the longitudinal axis of said control-sleeve coinciding with that of said device, and said control-sleeve being movable along said axis.

3. A closure device in accordance with claim 2, further comprising a cylindrical supporting element, said control-sleeve also being cylindrical, said supporting element bearing said spindles and being adapted to guide said control-sleeve.

4. A closure device in accordance with claim 3, further comprising a flange integral with said control-sleeve and two parallel jacks having respective bodies and rods, said jack-bodies being secured to opposite sides of said apparatus and said jackrods both being connected to said flange and situated in a plane containing the longitudinal axis of said device, said control-sleeve being controlled by said jacks.

5. A closure device in accordance with claim 4, wherein said apparatus includes an end section forming part of said device, said end section bearing said main gasket at its one end and said plug at its other end, said plug being secured to the downstream end of said apparatus and comprising means for guiding said jack-rods.

6. A closure device in accordance with claim 5, wherein said apparatus further includes a stationary portion, said jack-rods being adapted to move said end section of said apparatus away from said stationary portion in cooperation with said means for guiding said jack-rods.

7. A closure device in accordance with claim 6, wherein said end section comprises two tubular elements engaged one within the other and two end flanges, one said end flange being associated with each said tubular element, said means for guiding said jackrods comprising two tubular tie-rods respectively adjustably connected to said two end flanges.

8. A closure device in accordance with claim 7, wherein said stationary portion comprises a downstream flange and said main gasket comprises two rigid rings and a ring made of synthetic resin or of an elastomer interposed between said rigid rings, one of said rigid rings resting against said inner tubular elements of said end section and the other of said rigid rings being pressed against said downstream flange.

9. A closure device in accordance with claim 8, wherein one of said tubular tie-rods is supported in such a way as to form a pivoting axis for said end section when said end section has been moved away from said stationary portion by said jack-rods.

10. A closure device in accordance with claim 9, wherein one of said jack-rods passes through the other of said tubular tie-rods and is formed of two parts attached to one another by a bayonet-type connection.

11. A closure device in accordance with claim 2, wherein said control-sleeve comprises in profile two frustoconical surface elements of differing inclination with respect to the longitudinal axis of said device, said surface elements cooperating successively with said rollers for causing said plug to open first slowly and then rapidly.

* * * * *